United States Patent [19]

Cheresnowsky

[11] Patent Number: 4,999,169

[45] Date of Patent: Mar. 12, 1991

[54] METHOD FOR SEPARATING TUNGSTEN FROM MOLYBEDNUM

[75] Inventor: Michael J. Cheresnowsky, Towanda, Pa.

[73] Assignee: GTE Products Corporation, Stamford, Conn.

[21] Appl. No.: 262,633

[22] Filed: Oct. 26, 1988

[51] Int. Cl.$^5$ ............................................. C01G 39/02
[52] U.S. Cl. ...................................... 423/54; 423/606
[58] Field of Search ............... 423/54, 56, 61, 606, 423/DIG. 14; 210/660, 688

[56] References Cited

U.S. PATENT DOCUMENTS 4,702,895 10/1987 Cheresnowky et al. ............. 423/54
4,885,144 12/1989 Cheresnowsky ...................... 423/54

Primary Examiner—Melvyn J. Andrews
Attorney, Agent, or Firm—L. Rita Quatrini; Donald R. Castle

[57] ABSTRACT

A method of separating tungsten from molybdenum wherein impure acid leached molybdenum trioxide containing tungsten is combined with ammonium hydroxide to form an ammonium molybdate solution, the solution is contacted with tin (IV) oxide hydrate to cause sorption of essentially all of the tungsten contained therein without causing sorption of molybdenum, the tin (IV) oxide hydrate with the sorped tungsten is separated from the ammonium molybdate solution, and the ammonium molybdate solution is dried and fired to obtain purified molybdenum trioxide.

27 Claims, 3 Drawing Sheets

METHOD FOR SEPARATING TUNGSTEN FROM MOLYBEDNUM

This invention relates to a method for separating tungsten from molybdenum by treating an ammonium molybdate solution with a tin (IV) oxide hydrate to sorb the tungsten. This results in a molybdenum solution which contains essentially no tungsten.

BACKGROUND OF THE INVENTION

Technical grade molybdenum trioxide usually contains from about 50 to about 200 weight parts per million tungsten. Because the chemistries of tungsten and molybdenum are similar, tungsten is not separated from molybdenum in conventional purification of technical grade molybdenum trioxide, such as by the process of U.S. Pat. No. 4,525,331. This is a problem because low tungsten levels, that is, <150 weight ppm W is required in high purity Mo powder. Many methods are found in the literature but they are expensive or impractical.

Therefore, a method to remove tungsten from molybdenum is desirable.

A publication entitled "Use of Hydrated Oxides of Multivalent Metals For Effective Removal of Tungsten From Molybdenum Compounds", by M. I. Semenov et al published in the Journal of Applied Chem. USSR (Zh Prikl Khim. (Leningrad), 1984, 57(7), 1501–6 relates to separation of tungsten from molybdenum by adding hydrated oxides of multivalent metals to a molybdate solution containing tungsten to cause sorption of the tungsten. Their procedure is different from that of the present invention in that they do not form the hydrated tin oxide in situ or use freshly prepared hydrated tin oxide, nor do they separate tungsten from molybdenum during the ammonium hydroxide digestion of impure molybdenum trioxide. Moreover, the procedure as carried out according to this publication takes as long as seven days. With the process of the present invention the time is much shorter thereby allowing the process of the present invention to be commercially feasible.

A patent entitled "Ammonium Molybdate of High Purity" by Papageorgios, Panajotis, Plonka, Marian, Walczak, Wladylsaw, (Przedsiebiorstwo Przemyslowo-Handlowe "Polskie Odczynniki Chemiczne") Pol. 54,639 (Cl. C 01 g), 20 Jan. 1968, Appl. 28 Mar. 1966; 2 pp, relates to obtaining spectrally pure ammonium molybdate by absorption on a freshly prepared suspension of products of hydrolysis of tin salts. However, preliminary purification is recommended and methyl alcohol is used to precipitate ammonium molybdate.

SUMMARY OF THE INVENTION

In accordance with one aspect of this invention, there is provided a method of separating tungsten from molybdenum which comprises adding impure acid leached molybdenum trioxide containing tungsten as an impurity to ammonium hydroxide to form an ammonium molybdate solution having a concentration of from about 150 g Mo/l to about 250 g mo/l and from about 0.001 g W/l to about 2 g W/l and a pH of from about 8.5 to about 10, and removing from the solution any insoluble residue, followed by contacting the ammonium molybdate solution with dry granular tin (IV) oxide hydrate in an amount sufficient so that from about 10 to about 200 g of tin (IV) oxide hydrate are present per liter of solution, for a sufficient time to cause the sorption of essentially all of the tungsten on the tin (IV) oxide hydrate without causing the sorption of the molybdenum, and separating the tin (IV) oxide hydrate with the sorped tungsten from the resulting purified ammonium molybdate solution.

In accordance with another aspect of the invention, the above described procedure is followed to form the ammonium molybdate solution and to remove the insolubles. The solution is then passed through dry granular tin (V) oxide hydrate in a column wherein essentially all of the tungsten is sorped on the tin (IV) oxide hydrate without the molybdenum being sorped.

In accordance with another aspect of the invention, the above described procedure is followed to form the ammonium molybdate solution and to remove the insolubles. The solution is contacted with a source of $Sn^{+4}$ ions in an amount sufficient to result in a concentration of from about 0.009 to about 0.55 moles of $Sn^{+4}$ ions per liter of solution to form tin (IV) oxide hydrate in situ while the pH is maintained at from about 8.5 to about 10 by addition of ammonia if necessary, to cause the sorption of essentially all of the tungsten on the tin (IV) oxide hydrate without causing the sorption of the molybdenum, followed by separation of the tin (IV) oxide hydrate with the sorped tungsten from the resulting purified ammonium molybdate solution.

In accordance with another aspect of the invention, the above described procedure is followed to form the ammonium molybdate solution and to remove the insolubles. A first slurry is formed by adding a source of $Sn^{+4}$ ions to ammonium hydroxide to form insoluble tin (IV) oxide hydrate. The first slurry is added to the ammonium molybdate solution to form a second slurry with the amount of the first slurry being sufficient to result in from about 0.07 to about 0.55 moles of tin (IV) oxide hydrate per liter of the second slurry while the pH of the second slurry is maintained at from about 8.5 to about 10 by addition of ammonia if necessary to cause the sorption of essentially all of the tungsten on the tin (IV) oxide hydrate without causing sorption of the molybdenum. The tin (IV) oxide hydrate with the sorped tungsten is separated from the resulting purified ammonium molybdate solution.

In accordance with another aspect of the invention, a digestion slurry is formed of impure acid leached molybdenum trioxide containing tungsten as an impurity, ammonium hydroxide, and a source of $Sn^{+4}$ ions to form tin (IV) oxide hydrate in situ. The molybdenum trioxide is digested in the ammonium hydroxide at a temperature of from about 50° C. to about 60° C. for from about 0.25 hours to about 2 hours to form an ammonium molybdate solution having a pH of from about 8.5 to about 10 and a concentration of from about 150 to about 250 g Mo/l. Essentially all of the tungsten in the ammonium molybdate solution is sorped on the tin (IV) oxide hydrate without sorption of the molybdenum. The tin (IV) oxide hydrate with the sorped tungsten and any other insolubles are separated from the resulting purified ammonium molybdate solution.

3

Figure 3:
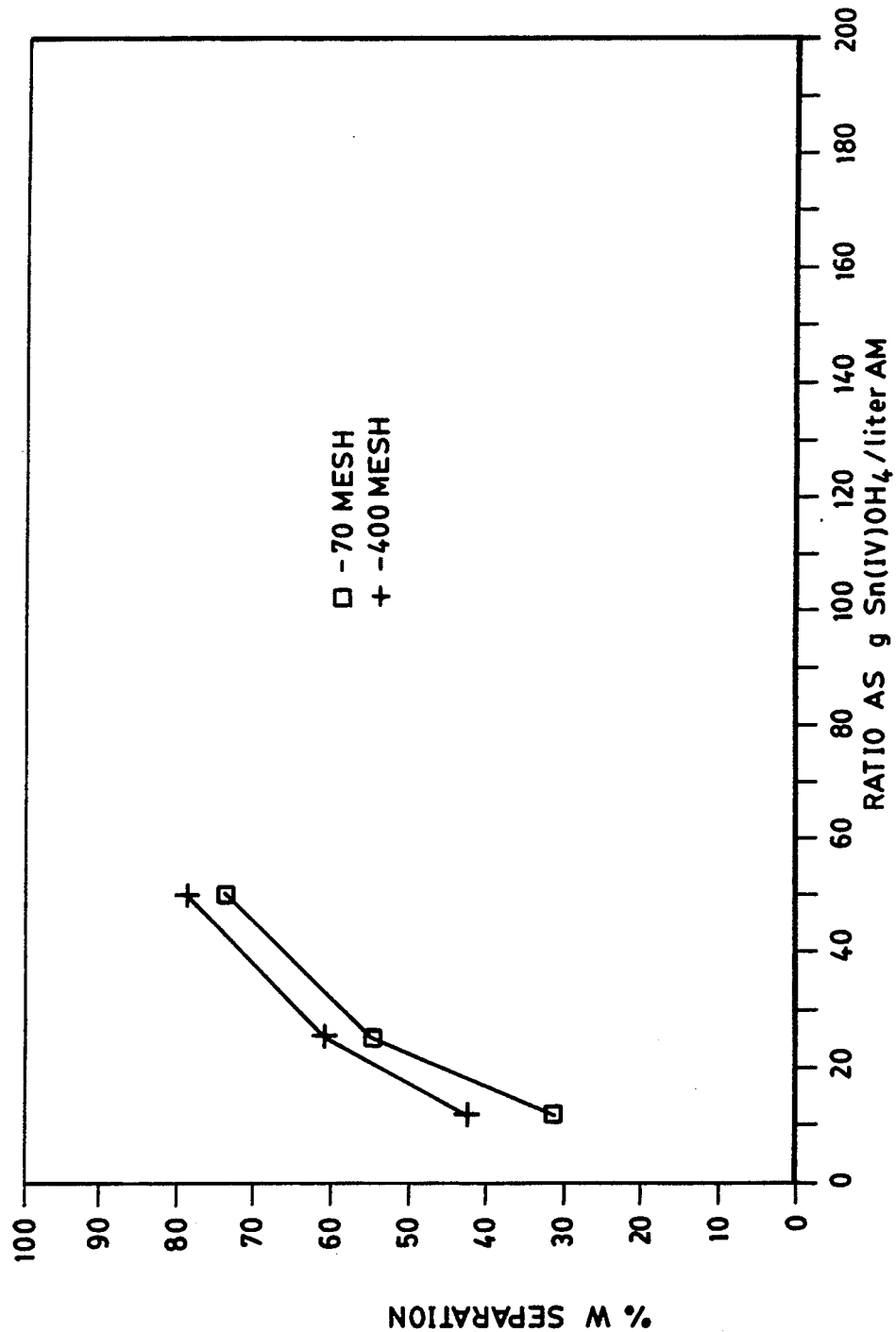

FIG. 3 is a plot of ratio of grams of tin (IV) oxide hydrate per liter versus percent of tungsten removed at two different particle sizes of tin (IV) oxide hydrate.

DETAILED DESCRIPTION OF THE INVENTION

For a better understanding of the present invention, together with other and further objects, advantages and capabilities thereof, reference is made to the following disclosure and appended claims in connection with the above described figures and description of some of the aspects of the invention.

By the method of the present invention, tungsten is separated from molybdenum by treating an ammonium molybdate solution containing from about 0.01 to about 2 g W/l and most typically from about 0.01 to about 0.1 g W/l by contacting the ammonium molybdate solution with a tin (IV) compound to sorp the tungsten onto the tin (IV) compound. This results in a separation of tungsten from molybdenum. As a result, the present invention provides a method wherein there can be direct control of the tungsten level in molybdenum and it is possible to obtain pure molybdenum from starting molybdenum trioxide which contains tungsten. Therefore, as a result a wider variety of sources of impure molybdenum trioxide can be processed to obtain pure molybdenum.

The starting material of the present invention is relatively impure molybdenum trioxide commonly known as technical grade molybdenum trioxide. The molybdenum trioxide is material that has been acid leached prior to being processed according to the present invention. By acid leaching is meant that the molybdenum trioxide is leached in a mineral acid at an elevated temperature to remove some impurities, especially potassium. The leaching is done preferably according to any one of the processes described and claimed in U.S. Pat. Nos. 4,525,331, 4,555,386, 4,596,701, 4,601,890, 4,604,266, 4,604,267, 4,612,172, and 4,643,884. These patents are herein incorporated by reference.

This material most typically has a tungsten content of from about 50 to about 200 weight parts per million of tungsten. This molybdenum trioxide is added to ammonium hydroxide of sufficient strength to form an ammonium molybdate solution. This is done generally by digesting the molybdenum trioxide in the ammonium hydroxide at a temperature of from about 50° C. to about 60° C. The amounts of molybdenum trioxide and ammonium hydroxide are selected so that the final concentration of molybdenum in the ammonium molybdate solution is from about 150 to about 250 g Mo/l and the pH of the solution is from about 8.5 to about 10. Anyone of average skill in the art knows how to adjust these amounts to result in the above concentration and pH. The tungsten content of the resulting solution is typically from about 0.001 to about 2 g W/l.

In accordance with one embodiment, any insoluble residue is removed from the solution by standard methods such as filtration. The ammonium molybdate solution is contacted with a sufficient amount of tin (IV) oxide hydrate for a sufficient amount of time which is typically from about 0.25 to about 4 hours and most typically from about 0.25 to about 1 hour to cause sorption of essentially all of the tungsten thereon without

4 causing sorption of the molybdenum. The solid tin (IV) oxide hydrate is added to the solution with agitation for a period of time to allow the equilibrium conditions to be reached. Generally, the amount of tin (IV) oxide hydrate is sufficient so that from about 10 to about 200 g and preferably from about 25 to about 100 g of tin (IV) oxide hydrate is present per liter of ammonium molybdate solution.

In accordance with this embodiment, tin (IV) oxide hydrate is first made separately. This is done by adding ammonium hydroxide to a 1M to about 2M solution of tin tetrachloride, which is made from anhydrous or pentahydrated tin tetrachloride, at room temperature to form a slurry. The addition of concentrated ammonium hydroxide is stopped when the precipitate becomes a thick gelatinous mass in which further stirring is not possible. Liquids are separated from the Sn(IV)oxide hydrate by filtration. The tin (IV) oxide hydrate can be filtered before the slurry becomes very viscous. The Sn(IV)oxide hydrate is washed with water, dried and then ground, typically to about $-70$ mesh and most preferably to about $-400$ mesh which improves sorption of tungsten, and this tin (IV) oxide hydrate is then added to the ammonium molybdate solution.

The tin (IV) oxide hydrate with the sorped tungsten is then removed from the resulting purified ammonium molybdate solution by any standard technique such as filtration.

Figure 1:
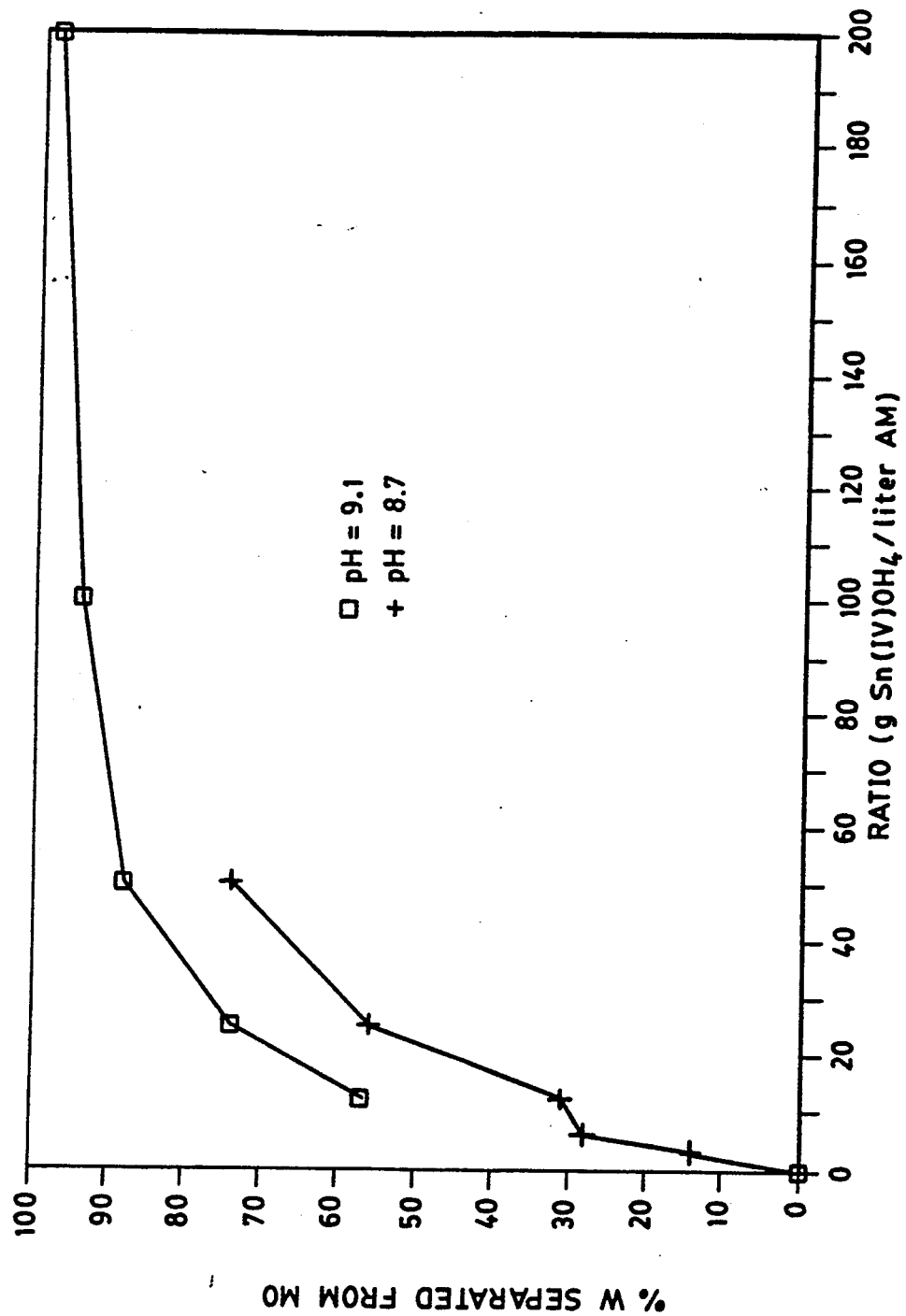
FIG. 1 is a plot of ratio of grams of tin (IV) oxide hydrate per liter versus percent of tungsten removed at various pH's.
Figure 2:
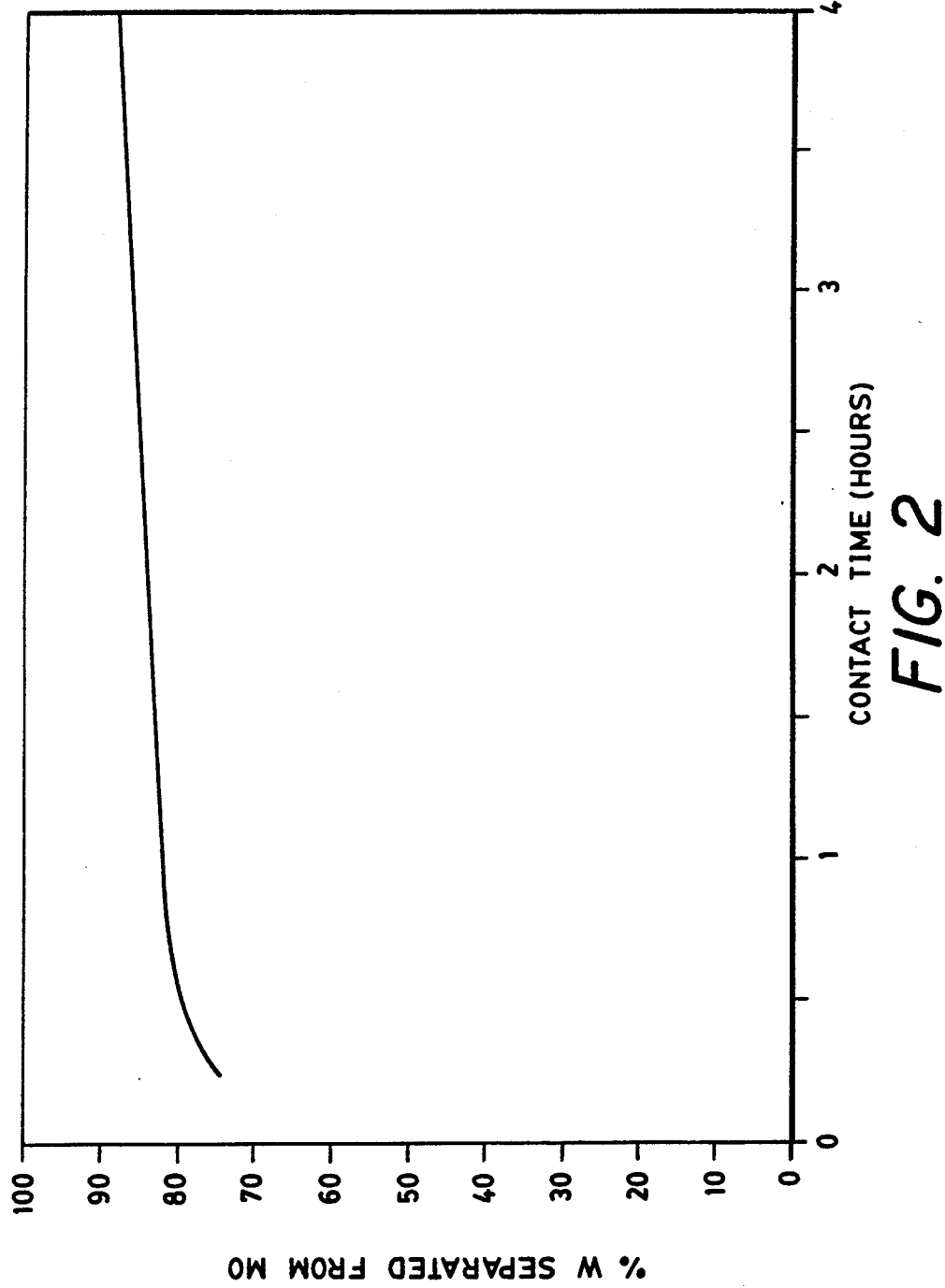
FIG. 2 is a plot of contact time of tin (IV) oxide hydrate with ammonium molybdate solution versus percent of tungsten removed.

The amount of tungsten that is sorped depends on the amount of tin (IV) oxide hydrate that is used. FIG. 1 is a plot of the percent of tungsten extracted versus amount of tin (IV) oxide hydrate at various pH's. It can be seen that a ratio of from about 100 to about 200 g of tin (IV) oxide hydrate per liter of ammonium molybdate solution results in removal of essentially all of the tungsten when the tungsten concentration is about 0.03 g/l and the molybdenum concentration is about 180 g/l. It is seen in FIG. 1 also that substantial removal of tungsten can be attained with the lesser amounts of tin (IV) oxide hydrate per liter of ammonium molybdate solution. In other words the amount of tin (IV) oxide hydrate that is used depends upon the percent of tungsten that is to be removed. For example, about 50 g of tin (IV) oxide hydrate per liter removes from about 70% to about 85% by weight of the tungsten. The amount of tungsten that is sorped increases with time up to about 4 hours. The effect of contact time is shown in FIG. 2. It can be seen from this figure that sorption of W is virtually unchanged after 1 hour. FIG. 3 shows the effect of particle size of the tin (IV) oxide hydrate. It can be seen that the smaller particle size ($-400$ mesh) is more effective than the larger particle size ($-70$ mesh) removing tungsten.

In accordance with another embodiment, the ammonium molybdate solution is formed and any insolubles are removed as described above. The solution is passed through the granular solid tin compound in a column. The tungsten can be recovered from the tin (IV) oxide by stripping it off the column of tin (IV) oxide hydrate with sodium hydroxide, for example, about a 1.0N NaOH solution. The results of passing ammonium molybdate through a column of tin (IV) oxide hydrate are given below in Table 1. The results are in weight parts per million of $MoO_3$.

TABLE 1

| BV | W | Al | Ca | Cu | Fe | Mg | Ni | Si | Sn | K |
|----|-----|-----|-----|-----|-----|-----|-----|-----|-----|-----|
| 0 | 140 | <5 | 4 | 5 | <3 | 2 | 6 | 11 | 12 | 150 |

TABLE 1-continued

| BV | W | Al | Ca | Cu | Fe | Mg | Ni | Si | Sn | K |
|----|---|----|----|----|----|----|----|----|----|---|
| 3  | 0 | 13 | 4  | <2 | 8  | <1 | 8  | 17 | <10 | 150 |
| 7  | 0 | 13 | 2  | <2 | 14 | <1 | 8  | 15 | <10 | 130 |
| 10 | 0 | 9  | 2  | <2 | 6  | <1 | 6  | 12 | <10 |     |
| 13 | 0 | 6  | 2  | <2 | 4  | <1 | 6  | 13 | <10 | 130 |
| 15 | 0 | 11 | 2  | <2 | 5  | <1 | 7  | 14 | <10 | 130 |
| 17 | 0 | 7  | 2  | <2 | 7  | <1 | 7  | 12 | <10 |     |
| 20 | 0 | 6  | 1  | <2 | <3 | <1 | 6  | 11 | <10 | 130 |
| 23 | 0 | <5 | <5 | <2 | 3  | <1 | 4  | 6  | <10 |     |
| 25 | 0 | <5 | <5 | <2 | 6  | <1 | 6  | 7  | <10 |     |
| 27 | 0 | 7  | <5 | <2 | 5  | <1 | 5  | 6  | <10 |     |
| 95 | 0 |    |    |    |    |    |    |    |     |     |

BV = Bed volume

Bed volume is a relative measure of volume. The volume of tin (IV) oxide hydrate that is held by a column is called bed volume. It is then used as a reference volume. If about 10 gallons of tin (IV) oxide hydrate make up a column, the bed volume is 10 gallons. For example, if 50 BV of solution are passed through the column before regeneration of the column then about 500 gallons of the solution are purified before regeneration.

It can be seen that W is quantitatively removed from the ammonium molybdate solution. It is interessting to note that with even as high as 95 bed volumes the tungsten is quantitatively removed from the ammonium molybdate solution. Copper and magnesium are also removed. The Sn does not contaminate the ammonium molybdate solution. Completeness of separation is demonstrated. Impurities in the feed including tungsten are measured spectrographically. Then the feed is tagged with $W^{181}$ radioisotope and passed through the column of tin (IV) oxide hydrate. When tungsten in the column effluent is measured by scintillation spectrometer, W counts are at background. The other elements are then measured spectrographically.

There are several other alternative procedures for contacting the ammonium molybdate with the tin (IV) compound.

One method for introducing the tin (IV) compound into the ammonium molybdate solution is to form the tin (IV) compound in situ, that is, forming the tin (IV) compound in the ammonium molybdate solution. The ammonium molybdate solution is formed as described previously and any insolubles are removed as described previously. The in situ formation of tin (IV) oxide hydrate is done typically by adding a source of $Sn^{+4}$ ions directly to the ammonium molybdate solution in an amount sufficient to form the proper amount of tin (IV) oxide hydrate. The amount of tin (IV) that is required in this procedure is from about 0.009 to about 0.5 and preferably from about 0.14 to about 0.50 moles of Sn/liter of solution. The source of $tin^{+4}$ ions can be tin (IV) tetrachloride, and hydrated tin (IV) tetrachloride with tin (IV) tetrachloride pentahydrate being especially preferred. The contact time of the tin (IV) oxide hydrate and the ammonium molybdate solution is the same as described previously. During the contacting of the $Sn^{+4}$ ions with the ammonium molybdate solution, the ammonium hydroxide can be added to maintain the pH at from about 8.5 to about 10 if necessary.

The hydrated tin oxide with the sorped tungsten is then separated from the purified ammonium molybdate solution usually by filtration. The tungsten level in the molybdenum trioxide product which is obtained when the purified solution is taken to dryness and fired to pure molybdenum trioxide is less than about 20 weight parts per million.

In accordance with another embodiment, the ammonium molybdate solution is formed and the insolubles are removed as described above. A first slurry is formed by adding a source of $Sn^{+4}$ ions to ammonium hydroxide to form insoluble or colloidal tin (IV) oxide hydrate. The source of $Sn^{+4}$ ions is the same as described previously. The first slurry is made preferably by adding concentrated ammonium hydroxide to a 1M to 2M solution of tin (IV) tetrachloride pentahydrate at room temperature. This slurry is added to the ammonium molybdate solution to form a second slurry. The amount of the first slurry that is added is sufficient so that from about 0.07 to about 0.55 and preferably from about 0.14 to about 0.55 moles of tin (IV) oxide hydrate will be present per liter in the second slurry. The pH is maintained at from about 8.5 to about 10 by addition of more ammonium hydroxide or ammonia if necessary. The contact time of the tin (IV) oxide hydrate with the ammonium molybdate solution is the same as described previously. The degree of separation of the tungsten from the molybdenum is a function of the amount of tin compound that is used. The given amounts of tin (IV) oxide hydrate insure that W levels that are low enough for very pure Mo powder to be produced from the purified molybdenum solution.

The hydrated tin oxide with the sorped tungsten is then separated from the purified ammonium molybdate solution usually by filtration.

In accordance with another embodiment, a starting digestion slurry is formed of the starting impure acid leached molybdenum trioxide containing tungsten as an impurity, ammonium hydroxide and a source of $Sn^{+4}$ ions to form tin (IV) oxide hydrate in situ. The molybdenum trioxide is digested in the ammonium hydroxide at a temperature of from about 50° C. to about 60° C. for length of time of from about 0.25 hours to about 2 hours to form an ammonium molybdate solution at a pH of from about 8.5 to about 10. The ammonia concentration and the amount of molybdenum trioxide are sufficient to give the above pH range and a concentration of from about 150 g Mo/l to about 250 g Mo/l. The source of $Sn^{+4}$ ions is as described previously. The tin is added in an amount sufficient so that the tin (IV) oxide hydrate is preferably from about 0.07 to about 0.55 moles per liter of the starting digestion slurry. The amount of $Sn^{+4}$ ions is sufficient to cause the sorption of essentially all of the tungsten without sorption of the molybdenum. The advantage of this process is that there is no filtration step after formation of the ammonium molybdate solution.

The hydrated tin oxide with the sorped tungsten any any other insolubles which might be present are then separated from the purified ammonium molybdate solution usually by filtration.

The advantage of the above described digestion method is that only one separation of insolubles has to be done. This is done after the digestion step in which both the tin (IV) oxide hydrate with the sorped tungsten and any other insolubles which might have formed during the initial formation of the starting slurry are removed. In the other methods there are two separation steps, that is there is one separation of insolubles after formation of the ammonium molybdate solution and another separation of the hydrated tin (IV) oxide with the sorped tungsten.

To more fully illustrate this invention, the following non-limiting examples are presented.

EXAMPLE 1

An ammonium molybdate solution containing about 180 g Mo/l and about 0.03 g W/l at a pH of about 9.1 at about 23° C. is tagged with $W^{181}$ radioisotope. To equal volumes of this solution are added different weights of dry −70 mesh tin (IV) oxide hydrate. The slurries are stirred at about 23° C. for about 4 hours and filtered. Tungsten in each solution is determined by scintillation spectrometer. The extent of sorption of tungsten is affected by the ratio of tin (IV) oxide hydrate mass per unit of volume of ammonium molybdate solution. As the ratio increases from about 5 g/l to about 75 g/l, sorption increases appreciably. As the ratio increases from about 75 g/l to about 200 g/l, sorption does not increase proportionately. In fact, sorption of tungsten becomes asymptotic. This data is shown in FIG. 1.

EXAMPLE 2

The effects of ratio (weight of tin (IV) oxide hydrate/volume of ammonium molybdate solution) is seen also at pH of about 8.7. An ammonium molybdate solution contains about 180 g Mo/l and about 0.03 g W/l. It is tagged with $W^{181}$ radioisotope. Different masses of dry −70 mesh tin (IV) oxide hydrate are added to equal volumes. The slurries are stirred for about two hours and filtered. Tungsten in each solution is measured by scintilation spectrometer. Sorption of tungsten increases as ratio increases to about 50 g tin (IV) oxide hydrate/l. This data is shown in FIG. 1.

EXAMPLE 3

A sample of tin (IV) oxide hydrate is divided into two parts. One half, the control is −70 mesh. The other half is ground to −400 mesh. An ammonium molybdate solution contains about 180 g Mo/l and about 0.03 g W/l and is at a pH of about 8.7. This solution is tagged with $W^{181}$ radioisotope. Three different masses of −70 mesh tin (IV) oxide hydrate are added to about 25 ml volumes of the solution. The same masses of −400 mesh tin (IV) oxide hydrate are added to about 25 ml volumes of the solution. The slurries are stirred for about two hours and filtered. The solutions are analyzed for W by scintillation spectrometer and the data show that sorption of W increases as particle size of tin (IV) oxide hydrate decreases. This data is shown in FIG. 3.

EXAMPLE 4

A solution of $SnCl_4$ having a concentration of about 2M is added to an ammonium molybdate solution at a pH of about 10, stirred for about 2 hours at room temperature, filtered and allowed to stand overnight. A haze forms and the solution is filtered to remove some insolubles that form. The resulting purified ammonium molybdate solution is evaporated to dryness and fired to molybdenum trioxide. Not only was the tungsten essentially completely removed, but also some calcium and magnesium are removed.

EXAMPLE 5

Tungsten is separated from molybdenum when tin (IV) oxide hydrate is used in the ammonium hydroxide digestion of molybdenum trioxide according to the following procedure. About 60 grams of technical grade molybdenum trioxide containing about 130 weight parts per million tungsten are digested in enough ammonium hydroxide to dissolve the molybdenum trioxide. About 55 ml of about 2M $Sn_4Cl.5\ H_2O$ is added and digestion is carried out for about 2 hours at about 60° C. The resulting slurry is cooled and and filtered. Another digestion is carried out the same as above except that $Sn^{+4}$ solution is not added. This digestion serves as the control. The analyses on molybdenum trioxide obtained by evaporating the digested solutions to dryness followed by firing to molybdenum trioxide are given below.

|  | weight ppm | | | | | | |
|---|---|---|---|---|---|---|---|
| Digestion | W | Al | Ca | Cu | Fe | Mg | Si |
| Control (no Sn) | 120 | 62 | 25 | 49 | 43 | 12 | 39 |
| Sn added | <20 | 13 | 6 | <4 | 10 | 3 | 12 |

Tungsten is very effectively removed. Other purification occurs also. Al, Ca, Cu, Fe, Mg, and Si are lower when the tin compound is used.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method of separating tungsten from molybdenum, said method comprising:
   (a) adding impure acid leached molybdenum trioxide containing tungsten as an impurity to ammonium hydroxide to form an ammonium molybdate solution having a concentration of from about 150 g Mo/l to about 250 g Mo/l and from about 0.001 g W/l to about 2 g W/l and a pH of from about 8.5 to about 10;
   (b) removing from said ammonium molybdate solution any insoluble residue which is present therein;
   (c) contacting said ammonium molybdate solution with dry granular tin (IV) oxide hydrate in an amount sufficient so that from about 10 to about 200 g of tin (IV) oxide hydrate are present per liter of said ammonium molybdate solution, for a sufficient time to cause the sorption of essentially all of the tungsten on said tin (IV) oxide hydrate without causing the sorption of the molybdenum;
   (d) separating said tin (IV) oxide hydrate with said sorped tungsten from said ammonium molybdate solution;
   (e) drying said ammonium molybdate solution to obtain purified ammonium molybdate; and
   (f) firing said purified ammonium molybdate to obtain purified molybdenum trioxide.

2. A method of claim 1 wherein said impure acid leached molybdenum trioxide contains from about 50 to about 200 weight parts per million of tungsten.

3. A method of claim 1 wherein the particle size of said tin (IV) oxide hydrate is −70 mesh.

4. A method of claim 3 wherein the particle size of said tin (IV) oxide hydrate is −400 mesh.

5. A method of claim 1 wherein said amount of said tin (IV) oxide hydrate is from about 25 to about 100 g per liter of said solution.

6. A method of claim 1 wherein said ammonium molybdate solution is contacted with said tin (IV) oxide hydrate for a period of time of from about 0.25 hours to about 4 hours.

7. A method of claim 6 wherein said period of time is from about 0.25 hours to about 1 hour.

8. A method of separating tungsten from molybdenum, said method comprising:
(a) adding impure acid leached molybdenum trioxide containing tungsten as an impurity to ammonium hydroxide to form an ammonium molybdate solution having a concentration of from about 150 g Mo/l to about 250 g Mo/l and from about 0.001 g W/l to about 2 g W/l and a pH of from about 8.5 to about 10;
(b) removing from said ammonium molybdate solution any insoluble residue which is present therein;
(c) passing said ammonium molybdate solution through a column containing a sufficient amount of tin (IV) oxide hydrate to cause the sorption of essentially all of the tungsten thereon without causing the sorption of the molybdenum;
(d) drying said ammonium molybdate solution to obtain purified ammonium molybdate; and
(e) firing said purified ammonium molybdate to obtain purified molybdenum trioxide.

9. A method of claim 8 wherein said impure acid leached molybdenum trioxide contains from about 50 to about 200 weight parts per million of tungsten.

10. A method of separating tungsten from molybdenum, said method comprising:
(a) adding impure acid leached molybdenum trioxide containing tungsten as an impurity to ammonium hydroxide to form an ammonium molybdate solution having a concentration of from about 150 g Mo/l to about 250 g Mo/l and from about 0.001 g W/l to about 2 g W/l and a pH of from about 8.5 to about 10;
(b) removing from said ammonium molybdate solution any insoluble residue which is present therein;
(c) contacting said ammonium molybdate solution with a source of $Sn^{+4}$ ions in an amount sufficient to result in a concentration of from about 0.009 to about 0.55 moles of $Sn^{+4}$ ions per liter of said ammonium molybdate solution to form tin (IV) oxide hydrate in situ while the pH is maintained at from about 8.5 to about 10, to cause the sorption of essentially all of the tungsten on said tin (IV) oxide hydrate without causing the sorption of the molybdenum;
(d) separating said tin (IV) oxide hydrate with said sorped tungsten from said ammonium molybdate solution;
(e) drying said ammonium molybdate solution to obtain purified ammonium molybdate; and
(f) firing said purified ammonium molybdate to obtain purified molybdenum trioxide.

11. A method of claim 10 wherein said impure acid leached molybdenum trioxide contains from about 50 to about 200 weight parts per million of tungsten.

12. A method of claim 10 wherein said source of $Sn^{+4}$ ions is selected from the group consisting of anhydrous tin (IV) tetrachloride and hydrated tin (IV) tetrachloride.

13. A method of claim 12 wherein said source of $Sn^{+4}$ ions is tin (IV) tetrachloride pentahydrate.

14. A method of claim 10 wherein said concentration of said $Sn^{+4}$ ions is from about 0.14 to about 0.55 moles per liter.

15. A method of claim 10 wherein said ammonium molybdate solution is contacted with said tin (IV) oxide hydrate for a period of time of from about 0.25 hours to about 4 hours.

16. A method of claim 15 wherein said period of time is from about 0.25 hours to about 1 hour.

17. A method of separating tungsten from molybdenum, said method comprising:
(a) adding impure acid leached molybdenum trioxide containing tungsten as an impurity to ammonium hydroxide to form an ammonium molybdate solution having a concentration of from about 150 g Mo/l to about 250 g Mo/l and from about 0.001 g W/l to about 2 g W/l and a pH of from about 8.5 to about 10;
(b) removing from said ammonium molybdate solution any insoluble residue which is present therein;
(c) forming a first slurry by adding a source of $Sn^{+4}$ ions to ammonium hydroxide to form insoluble tin (IV) oxide hydrate;
(d) adding said first slurry to said ammonium molybdate solution to form a second slurry with the amount of said first slurry being sufficient to result in from about 0.07 to about 0.55 moles of tin (IV) oxide hydrate per liter of said second slurry while the pH of said second slurry is maintained at from about 8.5 to about 10, to cause the sorption of essentially all of the tungsten on said tin (IV) oxide hydrate without causing the sorption of the molybdenum;
(e) separating said tin (IV) oxide hydrate with said sorped tungsten from the ammonium molybdate solution;
(f) drying said ammonium molybdate solution to obtain purified ammonium molybdate; and
(g) firing said purified ammonium molybdate to obtain purified molybdenum trioxide.

18. A method of claim 17 wherein said impure acid leached molybdenum trioxide contains from about 50 to about 200 weight parts per million of tungsten.

19. A method of claim 17 wherein said source of $Sn^{+4}$ ions is selected from the group consisting of anhydrous tin (IV) tetrachloride and hydrated tin (IV) tetrachloride.

20. A method of claim 19 wherein said source of $Sn^{+4}$ ions is tin (IV) tetrachloride pentahydrate.

21. A method of claim 17 wherein said ammonium molybdate solution is contacted with said tin (IV) oxide hydrate for a period of time of from about 0.25 hours to about 4 hours.

22. A method of claim 21 wherein said period of time is from about 0.25 hours to about 1 hour.

23. A method of separating tungsten from molybdenum, said method comprising:
(a) forming a digestion slurry of impure acid leached molybdenum trioxide containing tungsten as an impurity, ammonium hydroxide, and a source of $Sn^{+4}$ ions to form tin (IV) oxide hydrate in situ and digesting said molybdenum trioxide in said ammonium hydroxide at a temperature of from aobut 50° C. to about 60° C. for from about 0.25 hours to about 2 hours to form an ammonium molybdate solution having a pH of from about 8.5 to about 10 and a concentration of from about 150 g Mo/l to about 250 g Mo/l and containing tungsten wherein essentially all of the tungsten in said ammonium molybdate solution is sorped on said tin (IV) oxide hydrate without sorption of the molybdenum;

(b) separating said tin (IV) oxide hydrate with said sorped tungsten and any other insolubles from the ammonium molybdate solution;

(c) drying said ammonium molybdate solution to obtain purified ammonium molybdate; and (d) firing said purified ammonium molybdate to obtain purified molybdenum trioxide.

24. A method of claim 23 wherein said impure acid leached molybdenum trioxide contains from about 50 to about 200 weight parts per million of tungsten.

25. A method of claim 23 wherein said source of $Sn^{+4}$ ions is selected from the group consisting of anhydrous tin (IV) tetrachloride and hydrated tin (IV) tetrachloride.

26. A method of claim 25 wherein said source of $Sn^{+4}$ ions is tin (IV) tetrachloride pentahydrate.

27. A method of claim 23 wherein the amount of said $Sn^{+4}$ ions is from about 0.07 to about 0.55 moles per liter of said digestion slurry.

* * * * *